United States Patent [19]
D'Acremont

[11] 3,898,415
[45] Aug. 5, 1975

[54] WELD FLUX APPARATUS

[75] Inventor: Bernard D'Acremont, Saint-Nazaire, France

[73] Assignee: The Babcock & Wilcox Company, New York, N.Y.

[22] Filed: May 15, 1974

[21] Appl. No.: 469,995

[52] U.S. Cl. .................................. 219/73; 219/76
[51] Int. Cl.² ........................................ B23K 25/00
[58] Field of Search ..................... 219/73, 126, 76

[56] References Cited
UNITED STATES PATENTS

| | | | |
|---|---|---|---|
| 2,269,538 | 1/1942 | Lewbers ........................... | 219/73 X |
| 2,766,360 | 9/1956 | Landis et al. ..................... | 219/73 |
| 3,152,019 | 10/1964 | Shrubsall ......................... | 219/73 X |
| 3,323,647 | 6/1967 | Ogden et al. ..................... | 219/73 X |
| 3,735,087 | 5/1973 | Arnoldy ........................... | 219/73 |

Primary Examiner—J. V. Truhe
Assistant Examiner—N. D. Herkamp
Attorney, Agent, or Firm—Joseph M. Maguire; Robert J. Edwards

[57] ABSTRACT

An improvement in the recovery and reutilization of spent flux including apparatus for properly mixing continuous feeds of recovered and fresh fluxes and for conveying the reconstituted flux to the welding zone.

5 Claims, 1 Drawing Figure

PATENTED AUG 5 1975 3,898,415
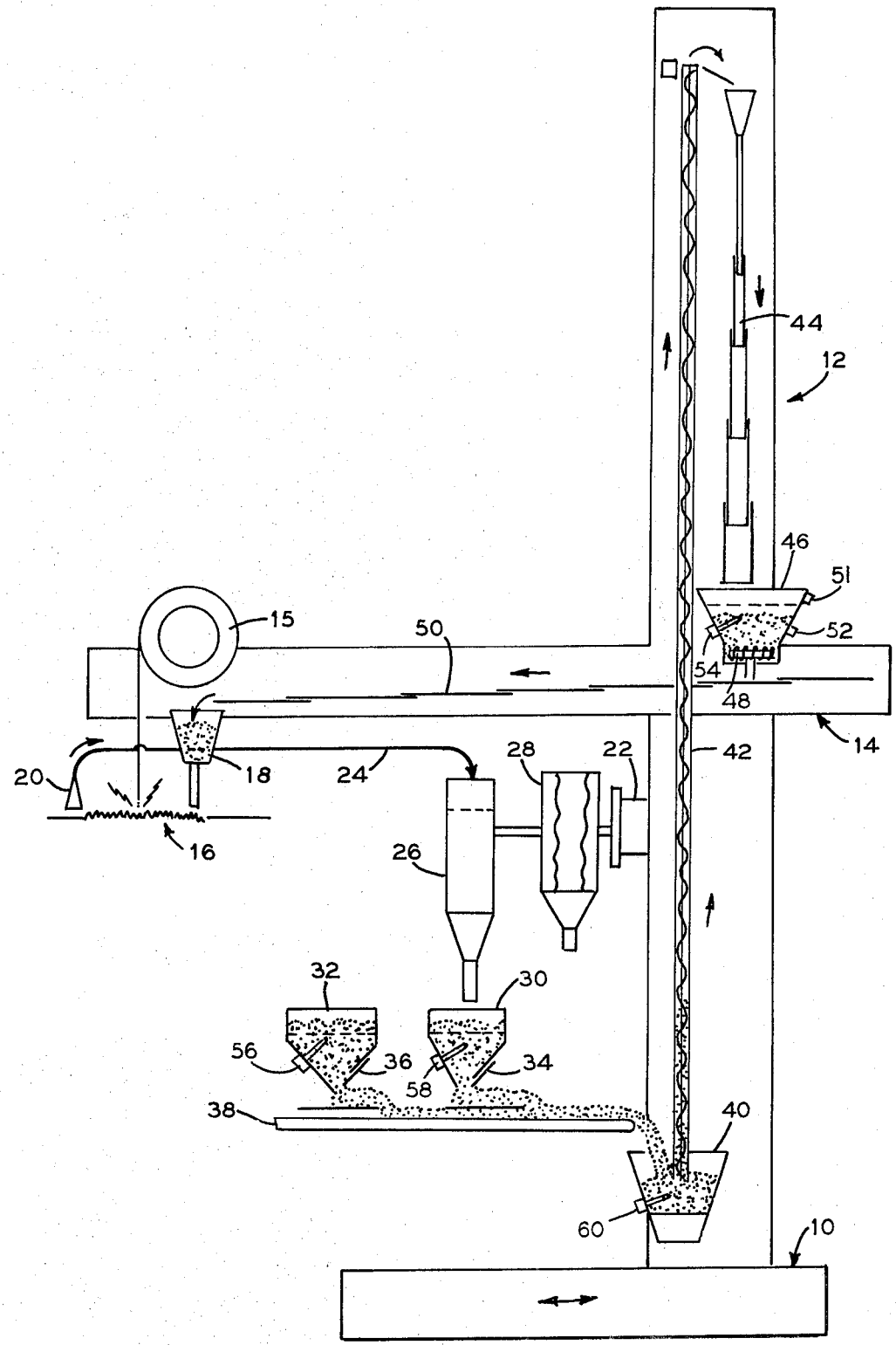

WELD FLUX APPARATUS

BACKGROUND OF THE INVENTION

This invention relates generally to welding apparatus and, particularly, to an improved apparatus for the recovery of flux.

Powdered flux is used with the submerged-arc welding process where it acts as a slag on the molten metal and has the function of protecting it against oxidation and nitridation. Flux may also be used to refine or enrich the weld metal. In order to achieve a satisfactory weld, one must choose from a variety of fluxes, either molten or agglomerated, the selection depending on the required operational and metallurgical characteristics.

The molten fluxes are composed largely of silicates, oxides and fluorides which are ground after having been fused in an electric furnace, these molten fluxes are of low hygroscopicity. The agglomerated fluxes are direct mixtures of oxides derived from ferrous alloys and other metallic compositions and are of average hygroscopicity. The molten fluxes consist of hard and highly abrasive compact particles whereas the agglomerated fluxes are of granular structure and are brittle and more sensitive to disaggregation.

There are known apparatus for the recovery of reusable portions of spent flux. These apparatus aspirate the spent flux and pass it through a separator wherein the slag and other coarse refuse is retained on a screen while allowing passage therethrough of the reusable flux. Fresh flux, necessary for re-enrichment of the recovered fraction, is periodically introduced directly into the separator by aspiration.

The known apparatus have not been altogether satisfactory in that they do not lend themselves to the continuous enrichment of flux and consequently require numerous separate cycles, e.g., recovery, transfer, addition, etc... which may adversely affect the flux such as altering its physical and chemical characteristics thereby rendering it unsuitable for use where quality welds are required. Moreover, due to the resultant discontinuity of operation, it is virtually impossible to add and mix flux under favorable conditions. These apparatus are particularly unfit for use with fluxes which are hygroscopic and necessitate baking before use. Furthermore, their requirement of induced draft speeds in excess of sixty feet per second give rise to damaging disaggregation of certain fluxes as well as a general alteration of their granulometry.

The present invention overcomes the aforementioned drawbacks and provides a practical solution to the transfer and recycling of fluxes used for welding processes particularly in submerged-arc type welding.

SUMMARY OF THE INVENTION

In accordance with the present invention, there is provided a welding apparatus of the type having a collector for receiving the spent flux, a separator being fed by the collector for recovering a reusable portion of the spent flux and a means for feeding fresh flux into the reusable flux portion and including a mixing means adapted to receive a continuous flow of reusable flux from the separator and a flow of fresh flux from the feeding means and a mechanical conveyor means for transporting the reconstituted flux from the mixing means to the welding zone.

The mixing means comprises a vibrating conveyor fed by gravity from separate fresh and spent flux hoppers, each of the hoppers being adapted with flow regulating means for providing the desired proportions of constituents to the flux mixture being conveyed to the welding zone. The vibrating conveyor may be adapted to receive additional useful constituents and to permit the rehomogenizing of the flux granulometry. The vibrating conveyor discharges into an intermediate hopper whose contents are picked-up by a mechanical conveyor of the Archimedes screw or like type, particularly when the welding zone is situated above the intermediate hopper level. It should be understood that the designation "mechanical conveyor means" is meant to include helical screw and belt type conveyors and any other transport means capable of displacing flux by direct contact with a mobile wall, e.g., in translation, rotation or vibration. The flux is discharged from the mechanical type conveyor to a distributing hopper, the latter being equipped with an adjustable speed screw type proportioner and the means for regulating the speed thereof to control the feed of flux to the welding zone. A continuous heating means is easily adapted to the instant apparatus since it too operates continuously, the heat would dry the flux when the latter contains hygroscopic constituents. The heating means may be in the form of thermostatically controlled electric resistance elements installed in one or more of the hoppers.

The apparatus of the present invention lends itself readily to automation which insures convenient control and regulation of its working parameters, i.e., flux composition, flow, temperature, etc... thereby resulting in welds and metal buildup of uniform quality while simplifying operator supervision.

BRIEF DESCRIPTION OF THE DRAWING

The drawing is a schematic illustration of the welding apparatus embodying the present invention.

DESCRIPTION OF THE PREFERRED EMBODIMENT

The illustrated device is intended for heavy plate work and comprises a welding apparatus formed with a mobile carriage 10 supporting a vertical shaft 12, the latter being fitted with a horizontal jib 14 equipped with a welding head 15 at its distal end. The head 15 includes electrode means producing a welding zone 16 on the workpiece. A hopper 18 supplies flux to the zone 16 and the spent flux is removed therefrom by an aspirator 20 whose suction is provided by a centrifugal fan 22. The recovered flux is conveyed through conduit 24 to a separator 26 which segregates the rejects and passes them into a dust separator 28. The reusable flux is discharged from the separator 26 to a recovered or spent flux hopper 30.

A fresh flux supply hopper 32 is located next to the recovered flux hopper 30 with both hoppers being arranged for continuous gravity feed onto a sloped vibrating conveyor 38 which mixes the fresh and reusable fluxes into a homogeneous mass before discharge into an intermediate hopper 40. The recovered and fresh flux hoppers 30 and 32 are equipped with adjustable slide valves 34 and 36, respectively. The slide valves 34 and 36 operate to maintain the desired relative proportions of fresh and reusable flux in the mixture being conveyed to the welding zone. Additional hoppers (not shown) may be provided over the vibrating conveyor 38 where it should prove desirable to introduce other constituents into the flux mixture. The vibrating conveyor 38 is preferably of the electromagnetic type and includes amplitude adjustment thereby providing the means for controlling the rate of flux feed to the intermediate hopper 40.

The reconstituted flux is transported from the intermediate hopper 40 to a distributing hopper 46 by a mechanical conveyor assembly, the arrangement thereof taking into account the degrees of movement required of the welding head 15 with respect to the vertical shaft 12. In the illustrated embodiment the jib 14 is capable of vertical and horizontal movement with respect to the shaft 12, the means for accommodating this movement are well known in the art and are not depicted so as not to encumber the illustration. The reconstituted flux contained in the intermediate hopper 40 is picked-up by a vertically oriented Archimedes type screw conveyor 42 which discharges the flux into a telescopic tube or stack 44 whose lower end telescopes in or out to accommodate the vertical movement of the jib 14. The lower end of the telescopic stack 44 feeds the reconstituted flux to a distributing hopper 46, the latter includes an adjustable speed proportioning screw which controls the feed rate of flux to the welding zone. The flux is discharged onto an inclined electromagnetic conveyor 50 having a series of overlapping vibrating plates which feed into the supply hopper 18, the latter deposits the reconstituted flux onto the welding zone 16.

The feed rate of reconstituted flux to the distributing hopper 46 is controlled by upper and lower level sensing devices 51 and 52 located on the hopper and connected through known circuitry (not shown) to regulate the opening of slide valves 34 and 36, the amplitude of vibration of conveyor 38 and the speed rate of the screw conveyor 42.

The welding apparatus of the present invention includes thermostatically controlled heating elements 54, 56, 58 and 60 inserted in the hoppers 46, 30, 32 and 40 respectively, and capable of regulating flux throughout a range of temperature from ambient to 650°F, thereby insuring complete drying of hygroscopic constituents, and dispensing with the requirement for pre-baking.

It should be noted that the instant apparatus limits the use of pneumatic transport to aspiration of the flux from the workpiece and to its discharge into the separator 26 thereby greatly minimizing the granulometric alteration of the flux.

It will be understood that the present invention is applicable to diverse welding processes using powdered flux and that the apparatus may be fixed or mobile, that it may have a jib or crane and may be single or multiheaded and may be adaptable to use in welding the interior of tubing and piping by means of suitable conveyors.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. A welding apparatus for use on a workpiece, electrode means for producing a welding zone on the workpiece, means for depositing flux on the welding zone, and suction means for removing spent flux from the workpiece, the improvement comprising separator means for recovering a reusable fraction of the spent flux, a first and second gravity feed means, the first feed means delivering reusable flux recovered by the separator means, and the second feed means delivering fresh flux, electric heater means disposed in each of said feed means for drying the flux passing therethrough, adjustable gate means for regulating each of said feed means, and vibrator means for receiving said regulated feed of fresh and reusable fluxes, said vibrator means combining the fresh and reusable fluxes to form a reconstituted flux, and machine transport means for conveying the reconstituted flux to said depositing means, said transport means including a screw conveyor.

2. The welding apparatus according to claim 1 wherein the transport means includes an electrically heated hopper for receiving flux from said screw conveyor, the hopper having flux level sensing means for regulating the flux discharge therefrom.

3. The welding apparatus according to claim 2 including a vibrating plate conveyor interposed between the hopper and depositing means, said plate conveyor being sloped in the direction of the depositing means.

4. The welding apparatus according to claim 1 wherein said first and second gravity feed means are in the form of separate hoppers, each of said hoppers having structure defining an outlet discharging to said vibrator means.

5. The welding apparatus according to claim 1 wherein the transport means includes an electrically heated hopper interposed between said vibrator and screw conveyor means.

* * * * *

UNITED STATES PATENT AND TRADEMARK OFFICE
CERTIFICATE OF CORRECTION

PATENT NO. : 3,898,415
DATED : August 5, 1975
INVENTOR(S) : Bernard D'Acremont

It is certified that error appears in the above-identified patent and that said Letters Patent are hereby corrected as shown below:

For the Assignee, "The Babcock & Wilcox Company"

should read --Babcock & Wilcox, Limited--.

Signed and Sealed this sixth Day of January 1976

[SEAL]

Attest:

RUTH C. MASON
*Attesting Officer*

C. MARSHALL DANN
*Commissioner of Patents and Trademarks*